United States Patent [19]

Murphy

[11] Patent Number: 4,628,806
[45] Date of Patent: Dec. 16, 1986

[54] DESKINNING TOOTH ROLL APPARATUS

[76] Inventor: David P. Murphy, 3208 Pickett, St. Joseph, Mo. 64503

[21] Appl. No.: 774,568

[22] Filed: Sep. 10, 1985

[51] Int. Cl.$^4$ ............................................ A22C 17/12
[52] U.S. Cl. .......................................... 99/486; 17/21; 17/62; 99/589; 99/590
[58] Field of Search ................... 99/537–539, 99/540, 584, 589, 588, 590, 591, 592, 489–492; 83/870, 871, 873, 874; 17/1, 21, 62; 29/121.1, 121.5, 121.6

[56] References Cited

U.S. PATENT DOCUMENTS 2,522,728  9/1950  Townsend .
2,539,692  1/1951  Hickman et al. .
2,578,952  12/1951 Townsend .
2,619,143  11/1952 Townsend .
2,715,427  8/1955  Townsend .
2,722,255  11/1955 Townsend .
2,839,113  6/1958  Townsend .
2,912,027  11/1959 Townsend .
3,504,721  4/1970  Townsend .
3,559,707  2/1971  Townsend .
3,741,105  6/1973  Beasley .
3,844,207  10/1974 Townsend .
4,466,344  8/1984  Schill .

Primary Examiner—Timothy F. Simone
Attorney, Agent, or Firm—Litman, Day & McMahon

[57] ABSTRACT

A deskinning apparatus comprises a deskinning knife, a rotatable shaft having removably sleeved thereon a plurality of cylinders and a stripper assembly for urging skins from the cylinders. Each of the cylinders have a plurality of circumferential teeth thereon spaced by grooves. The stripper assembly is mounted so as not to rotate with the shaft and cylinders. The stripper assembly includes a plurality of integral blades, each blade being operably received in a rotating groove of a respective cylinder.

11 Claims, 6 Drawing Figures

DESKINNING TOOTH ROLL APPARATUS

BACKGROUND OF THE INVENTION

The present invention relates to the skinning apparatus for use in the meat processing industry and, in particular, to a deskinning apparatus having a sectioned toothed roll and a stripper block mating with the toothed roll.

On many types of meat processing machinery where the meat is sectioned, trimmed or simply deskinned, there is normally a deskinning apparatus comprising a knife for separating the skin from the remaining meat and fat, a rotatable toothed roll for placing tension on the skin so as to achieve a clean cut of the skin from the meat and a stripper for eventually urging the skin away from the toothed roll.

Early toothed rolls had been manufactured by placing a number of individual toothed sections on a central shaft wherein each of the sections was essentially as wide as a single tooth width. This is shown in patents such as the Townsend U.S. Pat. No. 2,522,728. These individual sections were somewhat difficult to manufacture, since if they were milled, they had to be worked piece by piece which was very labor intensive. Toothed rolls made up of single tooth width sections tended to have relatively less stability and greater wear than the toothed rolls that replaced them.

In particular, later toothed rolls were manufactured as a series of spaced and circumferentially extending toothed sections cut on the surface of a single circular bar which also acted as the shaft for the toothed roll. An example of this type of toothed roll is seen in the Beasley U.S. Pat. No. 3,741,105. Unfortunately, when a tooth or several teeth of a toothed roll of the Beasley type breaks, the entire toothed roll must be discarded. This is not an infrequent occurance, since the meat on a particular piece of processing machinery has a tendency to engage the toothed roll at or near the same location for each subsequent piece of meat passing thereby. In addition, the single piece toothed rolls are relatively very expensive, since a great deal of labor is expended in milling the entire roll.

In the early toothed rolls, such as is shown in the Townsend U.S. Pat. No. 2,522,728, strippers which urge the skin away from the toothed roll could be sleeved on the roll in grooves between adjacent sections of circumferential rows of teeth, as each section is placed on a central shaft. When the toothed rolls became modified to the Beasley type device, it was no longer feasible to sleeve the strippers on the toothed roll and various assemblies were developed to ride in the groove of the toothed roll, but be attached to a different part of the machinery. Such strippers have had varying degrees of success, but in general have not had the stability or ease in change-out that is desired by operators of the meat processing machinery.

OBJECTS OF THE INVENTION

Therefore, the objects of the present invention are as follows: to provide a toothed roll for utilization in conjunction with deskinning processes wherein the toothed roll includes a plurality of toothed sections which are easily replaceable and interchangeable, yet provide a relatively high level of stability; to provide such an apparatus wherein the toothed roll sections comprise a plurality of circumferential rows of teeth spaced by grooves defined by a unitary sleeve and being removably mounted on a central shaft; to provide such a toothed roll apparatus including a skin stripper mateable with the grooves on the toothed roll; to provide such a skin stripper comprising a block having a plurality of unitarily joined toothed roll groove mating projections; to provide such a stripper wherein the block is removably locked in position relative to the toothed roll in a simple manner so as to expedite removal of the block should one of the projections break or to facilitate a change in the toothed roll; to provide such a toothed roll which is relatively less expensive to repair broken teeth, as only a single section needs to be replaced if damaged; to provide such a toothed roll apparatus which is highly stable in use, easy to manufacture and especially well adapted for the intended use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
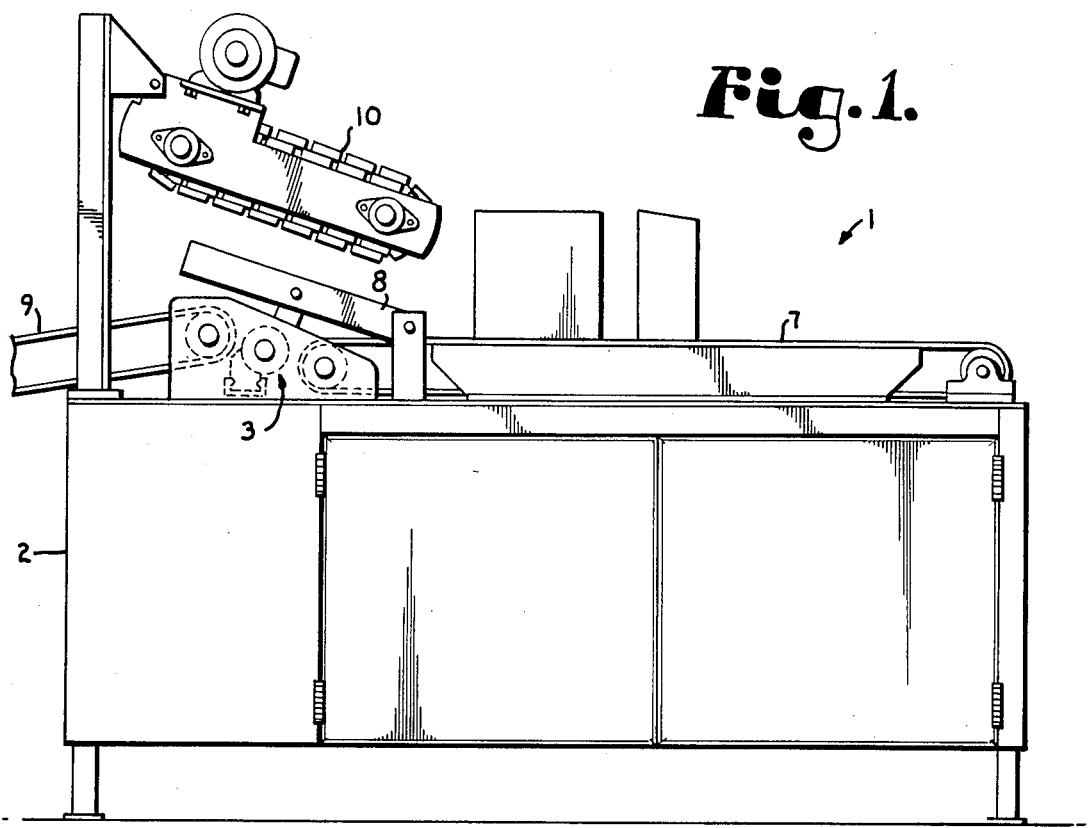
FIG. 1 is a side elevational view of a meat processing machine having a skin stripping apparatus according to the present invention mounted thereon.

Shown in FIG. 1 is a meat processing machine 1. The machine 1 is similar to the floating knife assembly for a meat defatter machine with positive blade position shown and described in U.S. Pat. No. 4,423,671 and attention is directed to this patent for additional working details of the machine 1. The machine 1 comprises a structural framework 2 enclosing an operating mechanism and a drive component (not shown) and having mounted thereon a deskinning apparatus 3 according to the present invention.

The meat processing machine 1 includes a feed conveyor 7, a floating knife assembly 8, a product take-off conveyor 9 and a product hold down and drive assembly 10. The conveyors 7 and 9, knife assembly 8 and hold down assembly 10 are positioned such that a piece of meat 13 to be cut or trimmed is fed along the conveyor 7 into a knife 14 of the knife assembly 8 wherein a portion of a fat layer 15 on the meat 13 is cut therefrom. The hold down assembly 10 ensures that the meat 13 is properly positioned relative to the knife 14 and drives the meat 13 past the knife such that the meat 13 with the fat layer 15 is eventually delivered to the take-off conveyor 9 which conveys it away from the machine 1.

While the deskinning apparatus 3 is shown on a particular meat processing machine 1, it is foreseen that the deskinning apparatus 3 could be utilized in conjunction with many different types of meat processing machines wherein removal of the skin is necessary.

The deskining apparatus 3 comprises a deskinning knife 19, a toothed roll 21, a stripper mechanism 22, drive means for rotating the toothed roll 21 comprising a drive pully 24 and structural support 25 for mounting the toothed roll 21 and stripper mechanism 22 in the framework 2.

Figure 2:
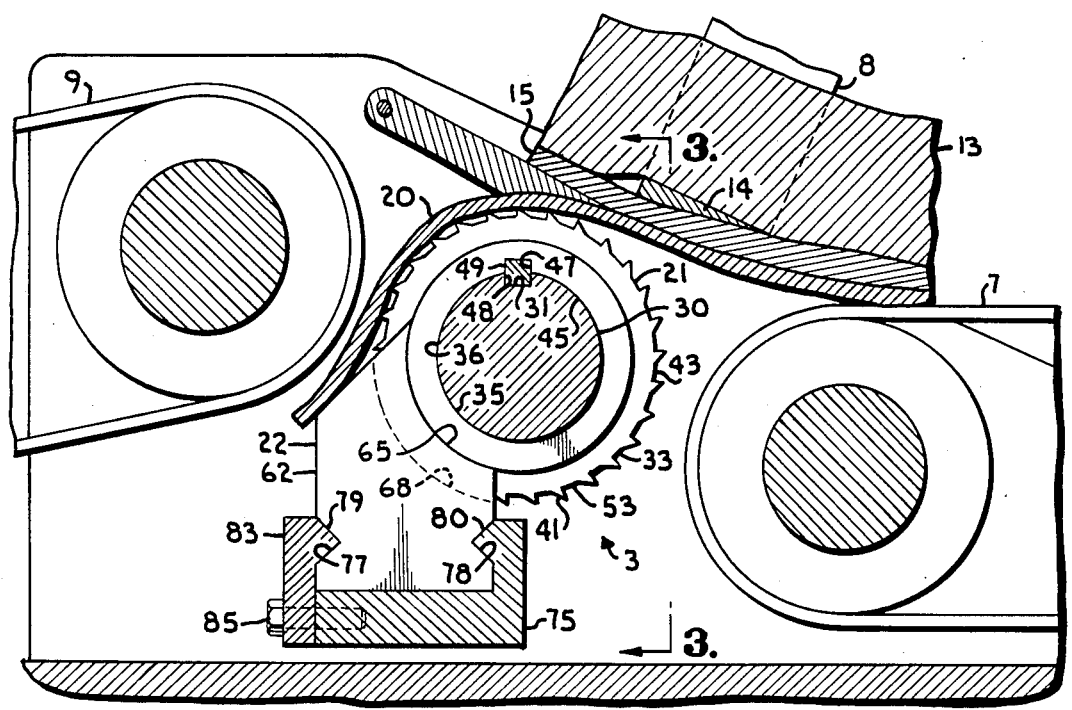
FIG. 2 is a fragmentary and enlarged cross-sectional and side elevational view of the meat processing machine showing the skin stripping apparatus in greater detail.
Figure 3:
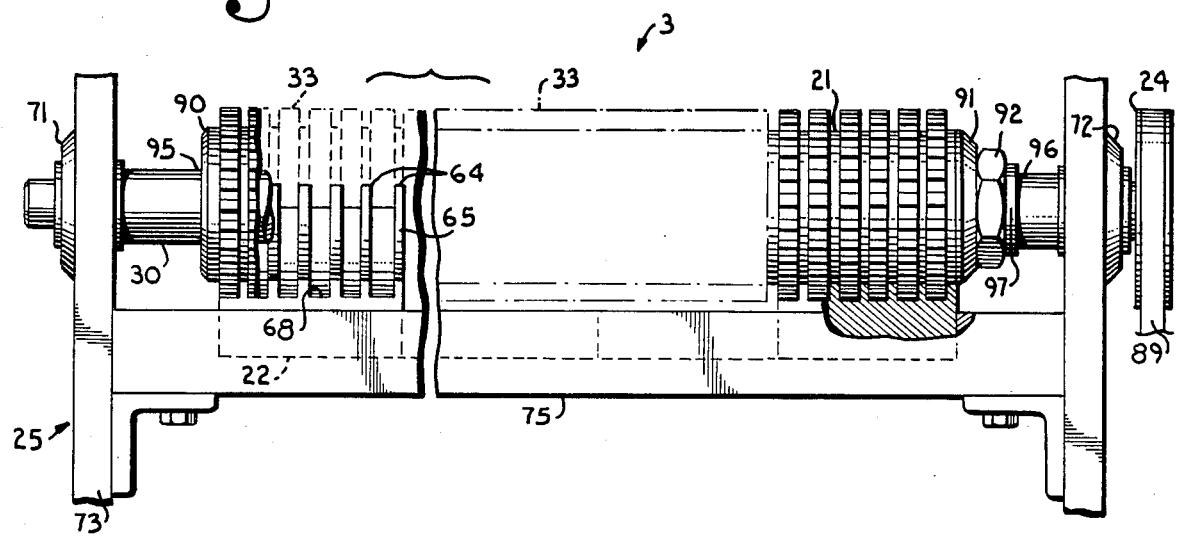
FIG. 3 is an enlarged and fragmentary front elevational view of the machine showing portions of the skin stripping apparatus in greater detail and with portions broken away to show greater detail thereof, taken along line 3—3 of FIG. 2.
Figure 4:
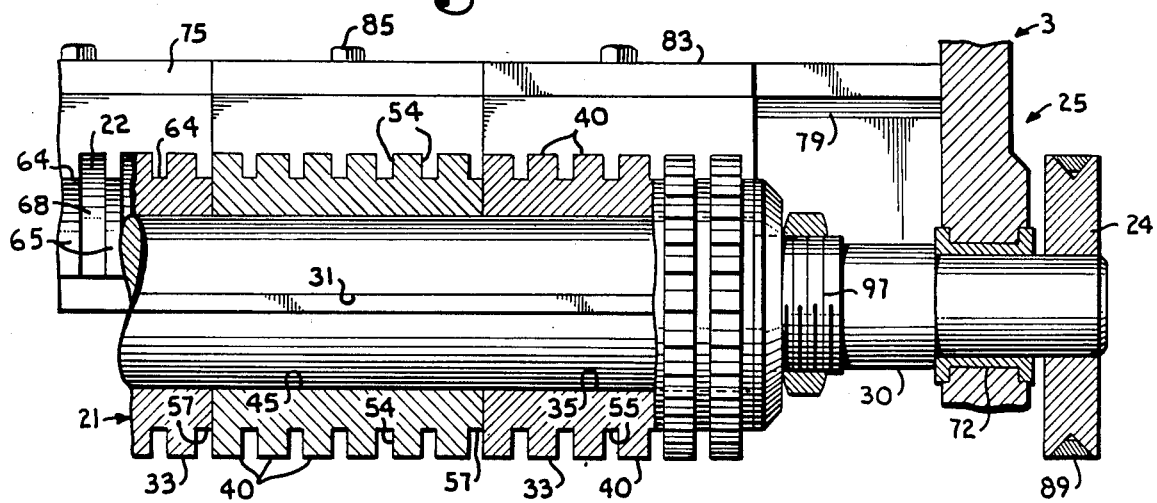
FIG. 4 is a further enlarged and top plan view of the machine and, in particular, the skin stripping apparatus, with portions broken away to show greater detail thereof.

As the meat 13 is driven past the deskinning apparatus 3, as shown in FIG. 2, a deskinning knife 19 mounted on the framework 2 beneath and slightly rearward of the knife 14 separates a skin layer 20 from the fat layer 15.

Referring to FIGS. 2, 3, 4 and 6, the toothed roll 21 comprises a rotatable shaft 30 having a notch or keyway 31 cut into the surface and along the length thereof so as to be parallel to the axis of rotation of the shaft 30 and plurality of toothed roll sections 33 slidably sleeved on the shaft 30. The shaft 30 is generally parallel to the cutting edge of the deskinning knife 19 and the knife 19 is oriented such that the shaft 30 rotates in the opposite direction, that is, the shaft 30 rotates counterclockwise in FIG. 2. Each toothed roll section 33 is annularly shaped having an inner surface 35 slidably and abuttingly engageable with a radially outer surface 36 of the shaft 30. Each annular section 33 has spaced circumferential rows 40 of regularly spaced teeth 41 jutting out from radially outer surfaces 43. The teeth 41 extend evenly completely around each section 33 in the respective rows 40.

The teeth 41 have a common orientation such that rotation of a section 33 about an axis thereof generally rotates the teeth 41 to sequentially present succeeding teeth of a row 40 to grip the skin layer 20. Each section inner surface 35 defines a bore 45 extending through the length of each toothed roll section 33 having approximately the same shape and diameter as the shaft outer surface 36.

The shaft 30 is constructed to permit a multiplicity of annular cylinders on toothed roll sections 33 to be coaxially sleeved thereon in end to end abutting fashion by passage of the shaft 30 through each section bore 45. Locking means secure the shaft 30 to the sections 33 when operably positioned relative to each other. In particular, the inner surface 35 of each toothed roll section 33 is provided with a notched groove or keyway 47 along the length thereof. When the keyway 31 and the section keyways 47 are aligned, they form a channel 48 through which a key 49, having a cross-section similar to that of the channel 48 is inserted, thereby locking together the shaft 30 and the toothed roll sections 33 so as to rotate about a common axis together, as best shown in FIG. 2.

Figure 6:
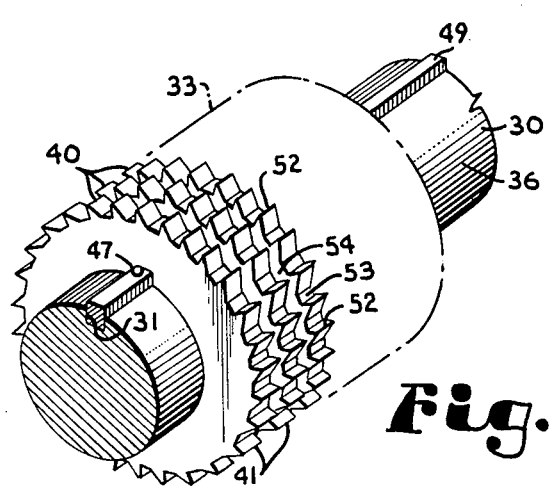
FIG. 6 is an enlarged and fragmentary perspective view of the toothed roll showing a single toothed roll section mounted on a toothed roll shaft.

With respect to FIGS. 2 and 6, each section tooth 41 has a radially outward edge 52 which engages the skin to be stripped and is generally triangular in shape when viewed from the side. The teeth 41 of each circumferential row 40 are mounted on a ledge 53 (comprising the surface 43) and each tooth 41 is spaced from adjacent teeth in a single row 40. The teeth 41 are approximately the same width as the ledge 53 associated therewith. Between each pair of adjacent ledges 53 is a groove or channel 54 having a radially inward generally cylindrically shaped surface 55. The channels 54 are approximately as wide as adjacent ledges 53. On one end of each section 33 is a channel 57 having a ledge 53 on only one side thereof. The channel 57 is positioned adjacent to a ledge 53 on an adjacent section 33, when two sections are positioned end to end, to provide proper spacing of ledges 53 such that each is approximately equally spaced from adjacent ledges 53 when all sections 33 are mounted on the shaft 30, thereby equally spacing adjacent teeth rows 40.

Figure 5:
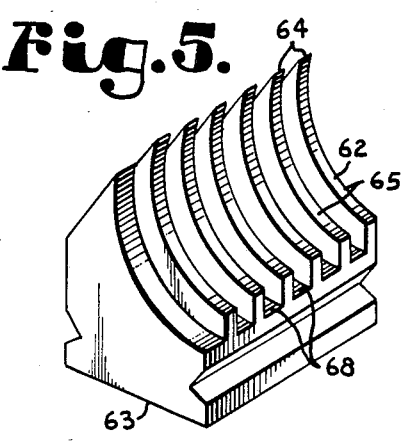
FIG. 5 is an enlarged perspective view of a stripper assembly utilized of the skin stripping apparatus.

FIG. 5 generally shows a stripper assembly 62 of the stripper mechanism 22 which is generally composed of a block having a base 63 and a plurality of integral blades 64 extending therefrom. Each assembly 62 is approximately the same width as a single toothed roll section 33. The blades 64 are generally identical in shape and have a curved outer arcuate surface 65 which mates with a substantial portion of an associated channel surface 55 on the toothed roll sections 33. In particular, the width of the blades 64 is such as to almost fill an associated channel 68 in a section 33 positioned adjacent the assembly 62, but allow sliding movement relative thereto. The radius of the surface 65 is preferably the same as the radius of the associated channel surface 55. Each blade 64 also has a slope which declines in a direction favoring the rotation of the shaft 30. Between adjacent blades 64 are channels 68 which allow slidable mating thereof with the tooth rows 40.

The deskinning apparatus structural support 25 includes opposed support bearings 71 and 72 for rotatably mounting the shaft 30 thereon. The bearings 71 and 72 are attached to braces 73 and 74 mounted on the framework 2. A stripper support structure 75 is attached at each end thereof to the braces 73 and 74. Each stripper assembly base 72 is mounted on the stripper support structure 75. As is seen in FIG. 2, each stripper base 72 has dentates 77 and 78 on opposite sides thereof which mate with spikes or projections 79 and 80 on opposite sides of the stripper support structure 75. One side of the stripper support structure 75 is divided into side panels 83 each having the same width as the individual stripper assembly bases 63. Each side panel 83 is removably held to the remainder of the support structure 75 by a screw or bolt 85 so as to allow easy access to the stripper assemblies 62 for removal or replacement on an individual basis.

The shaft 30 is rotatably driven by means of the coaxially mounted pully 24 which is in turn driven by a drive belt 89 which in turn is driven by motor means (not shown) which may be also utilized to operate other parts of the machine 1 or solely operate the deskinning apparatus 3.

The shaft 30 has a positioning ring 90 near one end thereof which is locked to the shaft 30 and radially extending therefrom to limit movement of the sections 33 axially with respect to the shaft 30 on an associated end 95 thereof. On an opposite end 96 of the shaft is a washer 91 and a locking nut 92 mating with suitably positioned threads 97 on the shaft 30. In this manner, the stripper blades 64 are aligned to be positioned in and move relative to the channels 54 on the sections 33 when the shaft 30 rotates.

In use, a slab of meat 13 travels on the feed conveyor 7, skin layer 14 down. The meat 13 is first engaged by the floating knife assembly 8 which slices a fat layer 15 from a remainder of the meat 13, the meat 13 after engaging the knife 8, then engages the knife 14. Then the skin layer 20 is contacted by the rotating toothed roll sections 33 rotating in the direction that the meat 13 is traveling. The teeth 41 grip the skin layer 20 so as to motivate the skin 20 to the left as seen in FIG. 2, so that the deskinning knife 14 is urged to separate the remaining attached skin layer 20 from the fat layer 15, while being pulled over the toothed roll sections 33. The skinless meat then passes onto the take-off conveyor 9. The skin layer 20 continues to rotate with the toothed roll 21 until contacted by the stripper mechanism blades 64. The skin layer 20 is urged from the roll 21 by the stripper blades 64 to a collection area (not shown).

It is to be understood that while certain forms of the present invention have been illustrated and described herein, it is not to be limited to the specific forms or arrangement of parts described and shown.

What is claimed and desired to be secured by Letters Patent is as follows:

1. A deskinning toothed roll apparatus comprising:
   (a) a rotatable shaft;
   (b) a plurality of annular cylinders having an outer surface; each of said surfaces having a plurality of spaced circumferential grooves extending radially inwardly relative to said surface;
   (c) said grooves spearating circumferential rows of teeth extending radially outward from the surface of a respective cylinder such that each cylinder has a plurality of circumferential rows of teeth thereon;
   (d) said annular cylinders being slidably sleeved on said shaft; and
   (e) locking means to releasably secure said cylinders to said shaft so that said cylinders rotate with said shaft.

2. The deskinning apparatus set forth in claim 1 including:
   (a) stripper means comprising a block positioned to extend along said shaft and having a plurality of integral blades extending from said block; and
   (b) said block being aligned relative to said cylinders such that said blades mate with said circumferential grooves on said annular cylinders over a substantial portion of said grooves; such that said blades strip skin associated with said teeth away from said teeth as said teeth rotate part of said blades.

3. The deskinning apparatus set forth in claim 2 wherein:
   (a) said rotatable shaft has a keyway positioned along a length of said shaft;
   (b) said cylinders have an inner bore abutting with an outer circumferential surface of said shaft; each of said cylinders has a keyway along a length of said cylinder inner surface; and
   (c) a key has a length equal to that of said shaft keyway and having a cross-sectional configuration generally mateable with the aligned cross-section of said cylinder and shaft keyways and positioned therein; so as to lock said cylinders and shaft together for rotation about a common axis thereof.

4. The deskinning apparatus set forth in claim 3 including:
   (a) a deskinning knife comprising a knife edge extending along a length of said rotatable shaft and parallel thereto; said knife edge is spaced from said cylinders and aligned in a direction opposite the direction of rotation of said cylinders.

5. The deskinning apparatus set forth in claim 1 wherein:
   (a) at least one of said rotatable shaft and said cylinders has a keyway along a mating surface thereof and including:
   (b) a key having a cross-sectional configuration generally equal to said keyway; said key locking said cylinders to said shaft when said cylinders are operably positioned on said shaft; and
   (c) a deskinning knife comprising a knife edge extending along a length of said rotatable shaft and generally parallel thereto.

6. A meat skinning apparatus comprising:
   (a) a rotatable toothed roll having spaced apart circumferential grooves thereon; said grooves extending inwardly from an outer surface of said roll;
   (b) said grooves separating circumferential rows of teeth extending outwardly from said surface of said roll,
   (c) stripper means comprising at least one block operably positioned near said roll; each of said blocks having a plurality of integral blades extending therefrom with each blade passing between a pair of said circumferential rows of teeth; said roll being rotatable relative to each of said blocks; and
   (d) each of said blocks being positioned such that said blades mate with said circumferential grooves of said toothed roll over a substantial portion of said grooves;
   (e) whereby as said toothed roll rotates with skin therein, the skin engages said blades and is urged away from said roll.

7. A meat skinning apparatus set forth in claim 6 including:
   (a) a deskinning knife comprising a knife edge spaced parallel forward extending along a length of said rotatable shaft; said roll being positioned relative to a cutting edge of said knife that when said roll rotatably engages a piece of skin, the skin is drawn past said knife edge by rotation of said roll.

8. A meat skinning apparatus comprising:
   (a) a rotatable shaft;
   (b) a plurality of annular cylinders; each of said cylinders having a plurality of spaced apart circumferential grooves; each of said grooves extending inwardly from an outer surface of a respective cylinder;
   (c) said grooves separating circumferential rows of teeth extending outwardly from a surface of a respective cylinder;
   (d) said annular cylinders being slidably sleeved onto said shaft in end to end configuration;
   (e) locking means for releasably securing said cylinders onto said shaft such that said cylinders rotate with said shaft;
   (f) stripper means comprising a block operably positioned near said cylinders and having a plurality of integral blades extending from said block;

(g) said block being positioned such that said blades mate with said circumferential grooves of said cylinders over a substantial portion of said grooves; said shaft being rotatable with respect to said block; and (h) each of said blades having a portion thereof which slopes away from said cylinders such that skin rotating with said cylinders engages said blades and is urged away from said cylinders.

9. The apparatus according to claim 8 wherein:

(a) a companion block is provided for each cylinder and has a length approximately equal to said cylinder;

(b) a support structure for mounting all of said blocks in end to end relationship; and (c) fastening means for individually and removeably locking each of said blades in said support structure to allow easy acces thereto for repair or replacement.

10. The meat skinning apparatus set forth in claim 8 wherein:

(a) said locking means comprises:
  (1) at least one keyway positioned along the mating surfaces of said shaft and each of said cylinders; and
  (2) a key having a cross-sectional configuration approximately equal to said keyway; such that when said shaft and said cylinders are operationally positioned said key locks said shaft and cylinders so as to rotate together; and (b) a deskinning knife comprising a knife edge spaced from and extending generally parallel along a length of said rotatable shaft; said edge being positioned above said cylinders and in an opposed direction to the rotation of said cylinders.

11. A meat skinning apparatus comprising:

(a) a framework structure for a meat processing machine comprising a housing, a conveyor for moving meat therealong, and a processing station along said conveyor;

(b) a deskinning apparatus mounted on said framework structure near an end of said conveyor;

(c) said deskinning apparatus comprising:
  (1) support means for mounting said apparatus on said structure;
  (2) a rotatable shaft supported by said support means;
  (3) a plurality of annular cylinders having spaced apart circumferential grooves, said grooves extending inwardly from an outer surface of a separate cylinder;
  (4) said grooves separating circumferential rows of teeth extending outwardly from a respective cylinder;
  (5) said annular cylinders being slidably sleeved upon said shaft in an end to end relationship;
  (6) locking means to releasably secure said cylinders onto said shaft so that said cylinders rotate with said shaft; and
  (7) said locking means comprising a keyway positioned adjacent mating surfaces of each of said cylinders and said shaft and a key mating with said keyway;

(d) a deskinning knife comprising a knife edge positioned near and extending generally parallel to said rotatable shaft; said knife edge being closely spaced from said cylinders and oriented in a direction opposite to said cylinders;

(e) stripper means comprising a block extending along said roll and having a plurality of blades; each blade being an integral extension of said block;
  (1) said block having a portion sloping in a direction opposite said deskinning knife and away from said cylinders; and
  (2) said blades having a portion mating with said circumferential grooves of said toothed roll over a substantial portion of said grooves such that said blades urge skin rotating on said cylinders away from said cylinders.

* * * * *